(12) United States Patent
Ball

(10) Patent No.: US 7,100,637 B1
(45) Date of Patent: Sep. 5, 2006

(54) WALL HYDRANT HAVING BACKFLOW PREVENTOR

(75) Inventor: William T Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 11/069,193

(22) Filed: Mar. 1, 2005

(51) Int. Cl.
*E03C 1/10* (2006.01)
(52) U.S. Cl. ............... 137/614.2; 137/360; 137/218
(58) Field of Classification Search ........... 137/614.2, 137/300, 272, 360, 218
See application file for complete search history.

(56) References Cited

U.S. PATENT DOCUMENTS

| | | | |
|---|---|---|---|
| 610,470 A * | 9/1898 | Buehler | ............... 137/614.2 |
| 5,590,679 A | 1/1997 | Almasy et al. | |
| 5,632,303 A | 5/1997 | Almasy et al. | |
| 6,550,495 B1 * | 4/2003 | Schulze | ............... 137/614.2 |
| 6,805,154 B1 * | 10/2004 | Dickey et al. | ............... 137/360 |
| 6,880,573 B1 * | 4/2005 | Berkman et al. | ........ 137/614.2 |

* cited by examiner

*Primary Examiner*—Kevin Lee

(57) ABSTRACT

A water hydrant having a housing with inlet and outlet ends, and a valve assembly having a valve seat and a valve closure element. A valve operating rod is secured to the valve closure element to open and close the inlet end. A backflow preventor check valve mounted within the housing provides for fluid flow only in the downstream direction toward the outlet end. In one embodiment, the backflow preventor and valve closure element are formed of a unitary body; likewise, the valve seat and housing are formed of a unitary body. In another embodiment, an extension body is associated with the valve operating rod and the backflow preventor is attached to the extension body upstream from the valve seat. In a further embodiment, the backflow preventor is secured to the housing upstream from the valve seat, and is adapted to remain in a fixed position when the inlet valve is adjusted.

5 Claims, 3 Drawing Sheets

WALL HYDRANT HAVING BACKFLOW PREVENTOR

BACKGROUND OF THE INVENTION

This invention relates to the protection of water hydrants from undesirable backpressure backflow, and back siphonage backflow.

Hoses and equipment are frequently connected to water hydrants to accomplish various tasks. Backpressure or back siphonage can be encountered during some tasks, particularly if a break occurs in the primary water line.

Wall faucets or hydrants known in the art generally include a hollow housing having an interior inlet end connected to a source of pressurized water and an exterior outlet. A valve is included within the housing and is connected by means of a rod to a manually operable handle outside the housing. Rotation of the handle causes the valve to open and close. These wall hydrants are normally wall-mounted on the exterior of a building.

A freezeless wall mounted water hydrant with a backflow preventor is shown in U.S. Pat. No. 5,632,303 to Almasy et al. Specifically, this freezeless water hydrant has an inlet valve in an inlet end of a housing, including a valve seat and a valve body. A valve operating rod extends through to an outlet end of the housing with an inner end of the rod secured to a valve body. A backflow preventor is secured to valve operating rod via the valve body, downstream from the valve seat.

The freezeless wall mounted water hydrant of U.S. Pat. No. 5,632,303 is not economically designed for use as a mild climate wall hydrant. Specifically, this freezeless water hydrant requires multiple separate pieces to form both the valve body and the backflow preventor. Further, the backflow preventor is secured to valve operating rod, which requires additional time for assembly. Lastly, the backflow preventor is required to be positioned downstream from the valve seat. All of these limitations limit the cost effectiveness and performance of this freezeless wall mounted water hydrant when applied to a mild climate environment.

It is therefore a principal object of this invention to provide a mild climate water hydrant having a valve body and a backflow preventor mounted within a hollow housing.

Another object of this invention is to provide a mild climate water hydrant having a valve body and a backflow preventor formed of a unitary body.

A further object of the present invention is to provide an improved mild climate water hydrant having a backflow preventor adapted to remain in a fixed non-rotated position when the inlet valve is adjusted A still further object of the present invention is to provide an improved mild climate water hydrant having a backflow preventor positioned upstream from the valve seat.

These and other objects will be apparent to those skilled in the art.

SUMMARY OF THE INVENTION

A wall mounted water hydrant includes a hollow housing having water inlet and outlet ends, and a water inlet valve in said housing adjacent said inlet end having a valve seat and a valve closure element. A valve operating rod is secured to the valve closure element to open and close the inlet valve. A backflow preventor is mounted within the housing and is adapted to seal the housing against upstream flow of water under backpressure conditions.

DESCRIPTION OF THE PREFERRED EMBODIMENT

Figure 1:
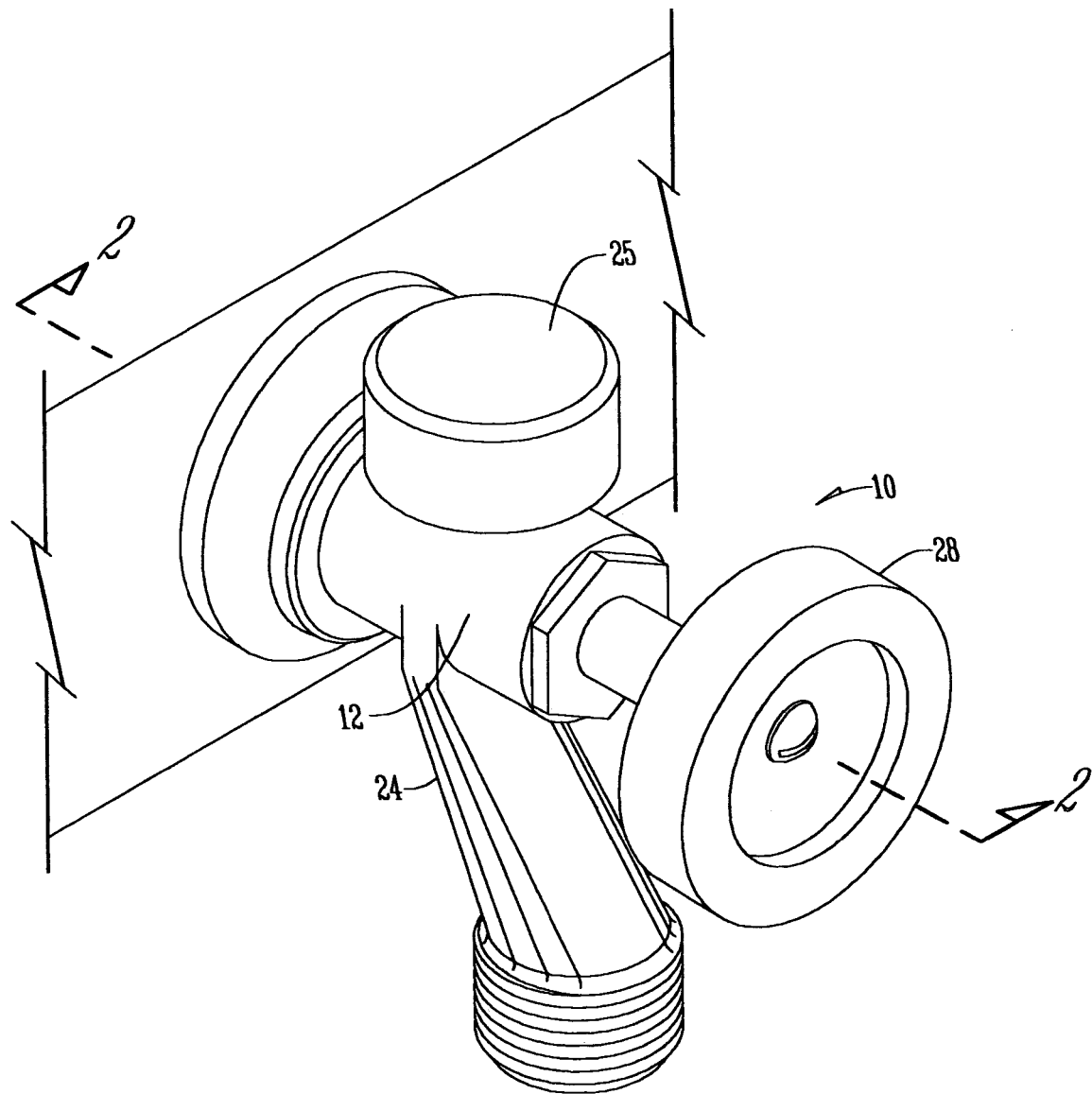
FIG. 1 is a perspective view of a water hydrant mounted to the outer wall of a house.
Figure 2:
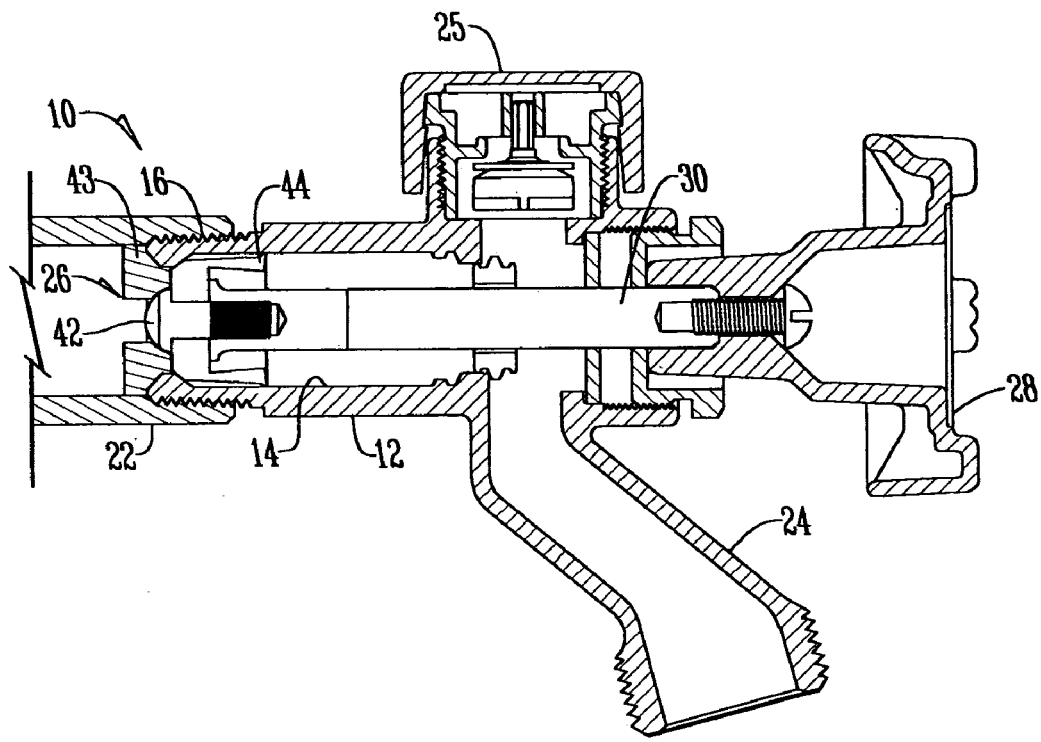
FIG. 2 is a sectional view taken along line 2—2 of FIG. 1 showing one embodiment of the water hydrant.

Referring to FIG. 1, the numeral 10 generally designates the wall-mounted water hydrant of the present invention. As shown in FIG. 2, hydrant 10 includes a hollow housing 12 having a central bore 14. One end of the hollow housing 12 includes a connector portion 16. The connector portion 16 has external male pipe threads as shown in FIG. 2 adapted to threadably mate with a conventional source of pressurized water. Alternatively, the connector portion 16 could have internal female threads that mate with a source of pressurized water or is connected in any conventional manner such as being soldered. The other end of bore 14 is in communication with a water outlet port 24 and a vacuum breaker or vent 25.

A movable valve assembly 26, located centrally and within bore 14, is in sealed engagement with the end of the bore 14 that is associated with the outlet port 24. Movable valve assembly 26 can be retracted from a closed position shown in FIG. 2 to the open position (not shown) by a manual means for rotating, such as a handle 28, which is connected to one end of an operating rod 30.

The other end of operating rod 30 is connected to a valve closure element or body 42. Valve closure element 42 is retracted or advanced axially within bore 14 by rotating handle 28. When handle 28 is rotated in one direction, valve closure element 42 eventually comes into contact with a valve seat 43 as shown in FIG. 2. In this position, valve closure element 42 is seated on seat 43 and the flow of fluid from inlet pipe 22 to the outlet port 24 is blocked. When the valve closure element 42 is disengaged from the valve seat 43, fluid is permitted to flow through inlet pipe 22, connector 16, around the valve closure element 42, and to the outlet port 24.

Additionally, or alternatively, the valve seat 43 and the housing 12 are formed of a unitary body. As shown, the valve seat 43 is formed as an annular ring extending inwardly from the bore 14 of the housing 12. This arrangement provides a dual function piece that both operates as a bore for passage of fluid through the hydrant 10, but also as a seat for the valve closure element 42 to seal against.

To prevent backflow, which can be caused by excessive water pressure at outlet port 24, a backflow preventor 44 is provided downstream of the valve seat 43. Backflow preventor 44 is preferably made of a resilient, elastomeric material, such as rubber. Any conventional backflow preventor check valve may be used to allow the flow of fluid in only a downstream direction such as ball checks and spring checks as an example only. Alternatively, the backflow preventor 44 and valve closure element are formed of a unitary body.

Figure 3:
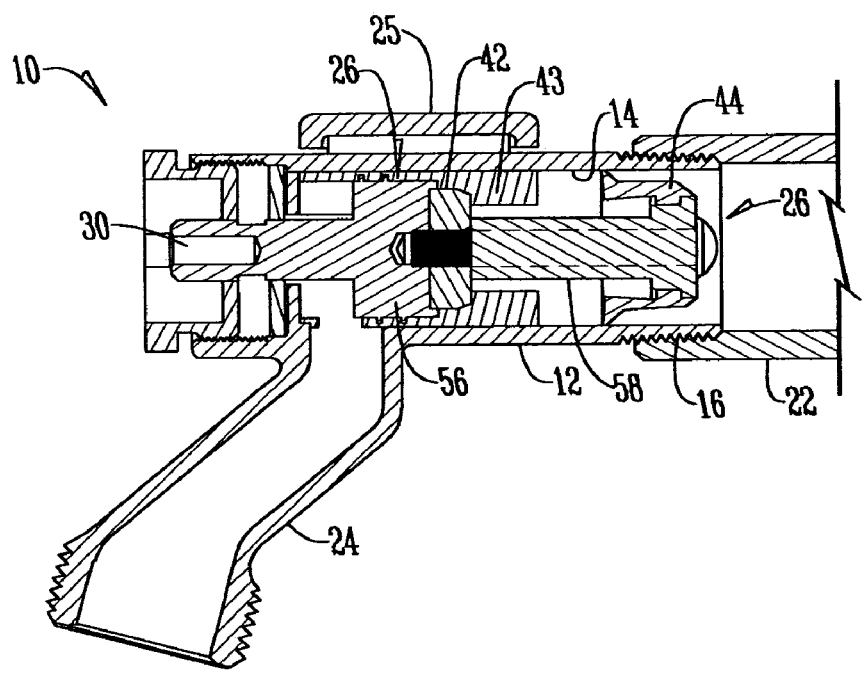
FIG. 3 is a sectional view showing another embodiment of the water hydrant.

With reference to FIG. 3, an alternative embodiment of the water hydrant 10 is shown, with similar parts having corresponding numerals. In this embodiment the valve rod assembly 26 includes a stem screw threadably received within bore 14 and mounted to valve rod 30 at one end. Mounted on the opposite end of the stem screw 56 is valve closure element 42. When the valve assembly 26 is rotated in one direction, the valve closure element comes into contact with valve seat 43 which is centrally located within housing 12. In this position, valve closure element 42 engages seat 43 to seal against the flow of fluid from inlet pipe 22 to the outlet port 24. When valve closure element 42 is disengaged from valve seat 43, fluid is permitted to flow through inlet pipe 22 to outlet port 24.

Extending upstream from the valve closure element 42 through bore 14 is an elongated mounting rod 58. The mounting rod 58 has a diameter less than the diameter of the bore 14 to allow fluid to pass from the inlet pipe 22 to the outlet port 24 between the mounting rod 58 and the wall of the bore 14. The mounting rod is connected to the interior wall of the hollow housing 12 or to the valve closure element 42. Mounted on the end of the mounting rod 58 upstream of the valve closure element 42 is a check valve 44 that engages the interior wall of the bore 14 to allow flow in only a downstream direction.

Figure 4:
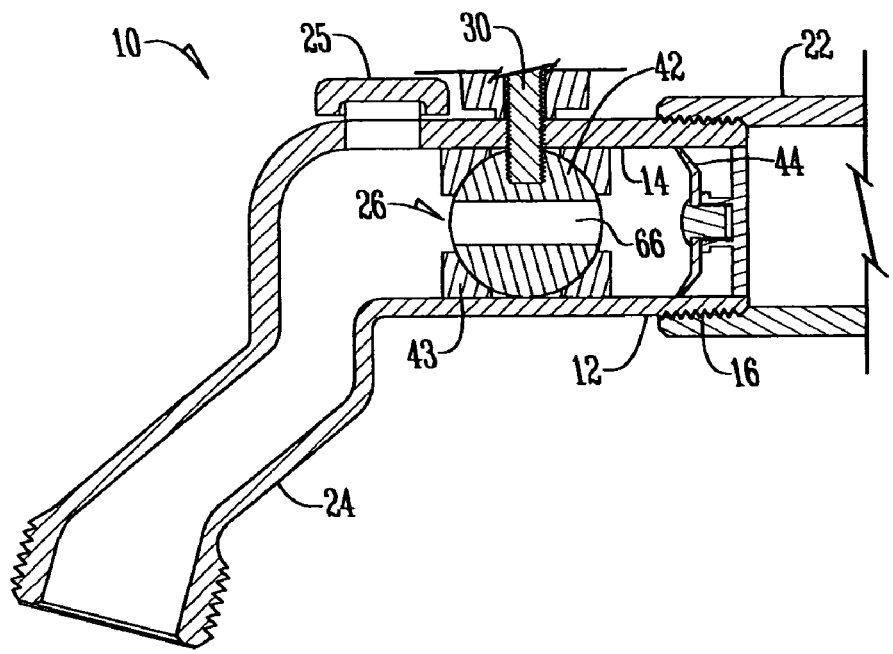
FIG. 4 is a sectional view showing a further embodiment of the water hydrant.

With reference to FIG. 4, a further embodiment of the water hydrant 10 is shown with similar parts having corresponding numerals. As shown, the water hydrant 10 is a ball type hydrant, where the valve assembly 26 is located centrally within bore 14 for rotating from a closed position (not shown) to the open position shown in FIG. 4 by a manual means for rotating, such as a handle 28 (not shown), which is connected to one end of an operating rod 30.

The valve closure element 42 is formed in a ball shape with a central passage 66 therein. The valve closure element 42 is rotated within the bore 14 by rotating valve rod 30. When valve rod 30 is rotated in one direction, the central passage 66 of the valve closure element 42 engages a socket shaped valve seat 43 as shown in FIG. 4. In this position, the central passage 66 of the valve closure element 42 is seated on seat 43 and the flow of fluid from inlet pipe 22 to the outlet port 24 is blocked. When the central passage 66 of the valve closure element 42 is rotated to disengage from the 43, fluid is permitted to flow through inlet pipe 22, connector 16, around the valve closure element 42, and to the outlet port 24.

Figure 5:
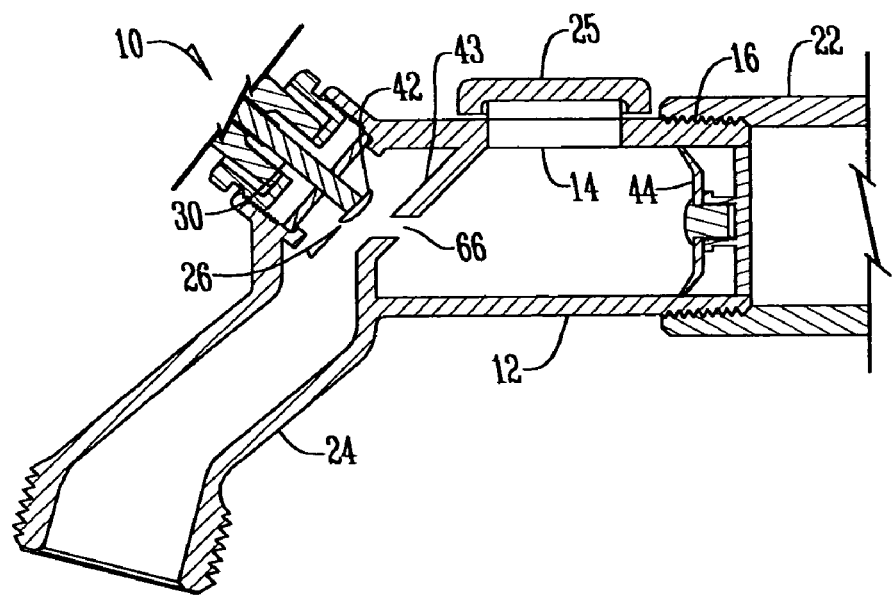
FIG. 5 is a sectional view showing a still further embodiment of the water hydrant.

With reference to FIG. 5, a still further embodiment of the water hydrant 10 is shown with similar parts having corresponding numerals. As shown, the water hydrant 10 is a stem type hydrant, where the valve assembly 26 is located at an angle within bore 14 for rotating from a closed position (not shown) to the open position shown in FIG. 5 by a manual means for rotating, such as a handle 28 (not shown), which is connected to one end of an operating rod 30.

The other end of operating rod 30 is connected to a valve closure element or body 42. Valve closure element 42 is retracted or advanced angularly within bore 14 by rotating handle 28. When handle 28 is rotated in one direction, valve closure element 42 eventually engages the valve seat 43. In this position, valve closure element 42 is seated on seat 43 and the flow of fluid from inlet pipe 22 to the outlet port 24 is blocked. When the valve closure element 42 is disengaged from the 43, fluid is permitted to flow through inlet pipe 22, connector 16, around the valve closure element 42, and to the outlet port 24. Mounted upstream from valve closure element 42 is a backflow preventor 44 that permits fluid flow in only a downstream direction.

It is therefore seen that this invention will accomplish at least all of its stated objectives.

I claim:

1. A wall mounted hydrant, comprising:
   a housing securable to an inlet pipe and having an inlet end, an outlet end, and a water outlet port and a central bore;
   a valve assembly having a valve rod in the housing with an end secured to a valve closure element, and extending through the housing to the outlet end of the housing; and
   a check valve mounted within the housing upstream from the valve closure element to permit fluid flow only in a direction toward the outlet port;
   wherein the check valve is in sealed engagement within the central bore.

2. The hydrant of claim 1 wherein the check valve is mounted on a mounting rod.

3. The hydrant of claim 1 wherein the valve closure element is a stem screw.

4. The hydrant of claim 1 wherein the valve closure element is a ball.

5. The hydrant of claim 1 wherein the valve closure element is a stem closure element.

* * * * *